United States Patent [19]
Okada

[11] Patent Number: 6,000,514
[45] Date of Patent: Dec. 14, 1999

[54] ENGAGING DEVICE

[75] Inventor: Takashi Okada, Fuji, Japan

[73] Assignee: Jatco Corporation, Japan

[21] Appl. No.: 09/017,042

[22] Filed: Feb. 3, 1998

[30] Foreign Application Priority Data

Feb. 4, 1997 [JP] Japan .................................. 9-035640

[51] Int. Cl.$^6$ .............................. F16H 3/44; F16D 13/54; F16D 19/00
[52] U.S. Cl. ................................. 192/70.21; 192/85 AA; 188/71.5
[58] Field of Search .................................. 192/30, 70.17, 192/70.21, 70.23, 70.28, 85 AA, 106 F; 188/71.5; 475/326–331, 146

[56] References Cited

U.S. PATENT DOCUMENTS

| | | | |
|---|---|---|---|
| 4,226,319 | 10/1980 | Euler et al. | 192/850 A |
| 5,653,321 | 8/1997 | Takaoka et al. | 192/70.17 |
| 5,749,451 | 5/1998 | Gvochowski | 192/70.25 |
| 5,765,673 | 6/1998 | Nishiyawa et al. | 192/85 AA |
| 5,916,056 | 6/1999 | Okada | 475/331 |

*Primary Examiner*—Chris Schwartz
*Attorney, Agent, or Firm*—Rossi & Associates

[57] ABSTRACT

An engaging device is provided which includes support members having respective splines that face with each other in a radial direction, a plurality of first friction plates that mesh with the spline of one of the support members, a plurality of second friction plates that mesh with the spline of the other support member, the first and second friction plates alternately overlapping with each other in an annular overlap portion of the engaging device, and a hydraulic piston that is held by the one support member to be movable in a direction of an axis of relative rotation of the support members. The hydraulic piston has a plurality of pressing parts that are spaced from each other in a circumferential direction, for pressing the first and second friction plates in an axial direction thereby to given an engaging force to the friction plates. The engaging device further includes a pressure receiving plate disposed between the friction plates and the hydraulic piston, comprising an annular plate portion that meshes with the spline of the support member holding the hydraulic piston, and a cylindrical pressure receiving portion protruding from the annular plate portion toward the hydraulic piston and having an end face that is able to abut on the pressing parts of the hydraulic piston.

3 Claims, 6 Drawing Sheets

ENGAGING DEVICE

BACKGROUND OF THE INVENTION

1. Field of the Invention

The present invention relates to an engaging device, such as a multiple disc clutch or multiple disc brake, and in particular to such an engaging device incorporated in an automatic transmission.

2. Description of Prior Art

As one type of the engaging device, there has been known a braking device of an automatic transmission as disclosed in Laid-open Publication No. 2-48650 of Japanese Utility Model Application.

FIG. 6 is a vertical cross sectional view showing the braking device of an automatic transmission, and FIG. 7 is a cross sectional view taken along VII—VII line in FIG. 6.

This braking device is incorporated in an automatic transmission in which a torque converter is linked to a change-gear mechanism using a planetary gear device. The change-gear mechanism includes a plurality of planetary gear sets, clutches, and brakes. These clutches and brakes are engaged in different combinations, so that the plurality of planetary gear sets generates a shifting output to establish a desired change gear ratio.

As shown in FIG. 6, the known braking device includes a spline 64 formed in the inner surface of a circumferential wall of a transmission case 60 and held in mesh with a plurality of friction plates 63, and a plurality of friction plates 62 alternately overlapping with the friction plates 63 and held in mesh with a spline formed at the outer periphery of a ring gear 61. A seat rest for a spring seat is formed at the rear end face of the spline 64. Spring seat 65 engages with and is fixed to this seat rest.

A cylinder 68 is fixed via a seal member to the inner surface of the circumferential wall of the transmission case 60, and an annular hydraulic chamber 67 is formed between the inner surface of the circumferential wall and the cylinder 68. A ring-shaped brake piston 69 for pressing the friction plates 62, 63 is provided inside the annular hydraulic chamber 67 such that the piston 69 is freely slidable in the axial direction. Also, a plurality of return springs 70 for biasing or forcing the brake piston 69 in a direction away from the friction plates 62, 63 is disposed between the spring seat 65 and the brake piston 69, such that the return springs 70 are spaced apart from each other in the circumferential direction of the transmission.

As shown in FIG. 7, the plurality of return springs 70 are disposed in three groups 70A, 70B, and 70C that are spaced apart from each other at substantially equal intervals in the circumferential direction. Each group includes seven return springs 70 that are spaced from each other at substantially equal intervals in the circumferential direction.

In the above-described prior art, a pressing face of the brake piston 69 that presses the friction plates 62, 63 is divided into three parts 69A, 69B, 69C that are spaced apart from each other at substantially equal intervals in the circumferential direction, so as not to interfere with the return springs 70 of each of the three groups 70A, 70B, and 70C. In this arrangement, the friction plates 62, 63 are locally pressed at three locations by the thus formed pressing parts 69A, 69B, 69C of the brake piston 69, respectively. As a result, the friction plates 62 and 63, which are made of thin metal plates, are deformed, and do not contact uniformly with each other over the entire surfaces, namely, only local portions of the friction plates 62, 63 pressed by the brake piston 69 contact with each other. Consequently, the friction plates 62 and 63 may wear severely, with a risk of seize-up and other problems, and the durability of the brake disc is undesirably lowered.

SUMMARY OF THE INVENTION

It is therefore an object of the present invention to provide an engaging device in which friction plates have improved durability.

The above object may be accomplished according to the principle of the present invention, which provides an engaging device comprising: first and second support members having first and second splines, respectively, that face with each other in a radial direction, the support members being rotatable relative to each other; a plurality of first friction plates that mesh with the first spline of the first support member; a plurality of second friction plates that mesh with the second spline of the second support member, the first and second friction plates alternately overlapping with each other in an annular overlap portion of the engaging area; a hydraulic piston that is held by the first support member to be movable in a direction of an axis of relative rotation of the first and second support members, the hydraulic piston having a plurality of pressing parts that are spaced from each other in a circumferential direction, for pressing the first and second friction plates in an axial direction thereby to give an engaging force to the friction plates; and a pressure receiving plate disposed between the first and second friction plates and said hydraulic piston, comprising an annular plate portion that meshes with the first spline of the first support member holding the hydraulic piston, and a cylindrical pressure receiving portion formed integrally with the annular plate portion to protrude from the annular plate portion toward the hydraulic piston, the cylindrical pressure receiving portion having an end face that is able to abut on the plurality of pressing parts of the hydraulic piston.

The above-indicated first support member may be a case of an automatic transmission, and the second support member may be a member that is rotatable relative to the case.

In the engaging device constructed as described above, the pressure receiving plate disposed between the friction plates and the hydraulic piston is constructed to have the annular plate portion meshed with the spline of the support member holding the hydraulic piston, and the cylindrical pressure receiving portion formed integrally with the annular plate portion to protrude from this plate portion toward the hydraulic piston with its end face capable of abutting on the plurality of pressing parts of the piston. When the cylindrical pressure receiving portion of the pressure receiving plate is pressed by the plural pressing parts of the hydraulic piston, therefore, the annular plate portion formed integrally with the cylindrical pressure receiving portion having high rigidity is not deformed, and uniformly transmits pressing forces received from the pressing parts to the first and second friction plates. As a result, the first and second friction plates contact with each other uniformly over the entire surfaces thereof.

With the cylindrical pressure receiving portion provided as described above, a lubricating oil supplied to the first friction plates and second friction plates is blocked by the pressure receiving portion, and is therefore less likely to escape to the outside of these friction plates. Thus, the quantity of lubricating oil accumulating in the space having the first and second friction plates increases, and the durability of these friction plates is further improved.

BRIEF DESCRIPTION OF THE DRAWINGS

The invention will be described in greater detail with reference to a preferred embodiment thereof and the accompanying drawings, wherein.

DETAILED DESCRIPTION OF THE PREFERRED EMBODIMENTS

One preferred embodiment of the present invention will be now described.

Figure 1:
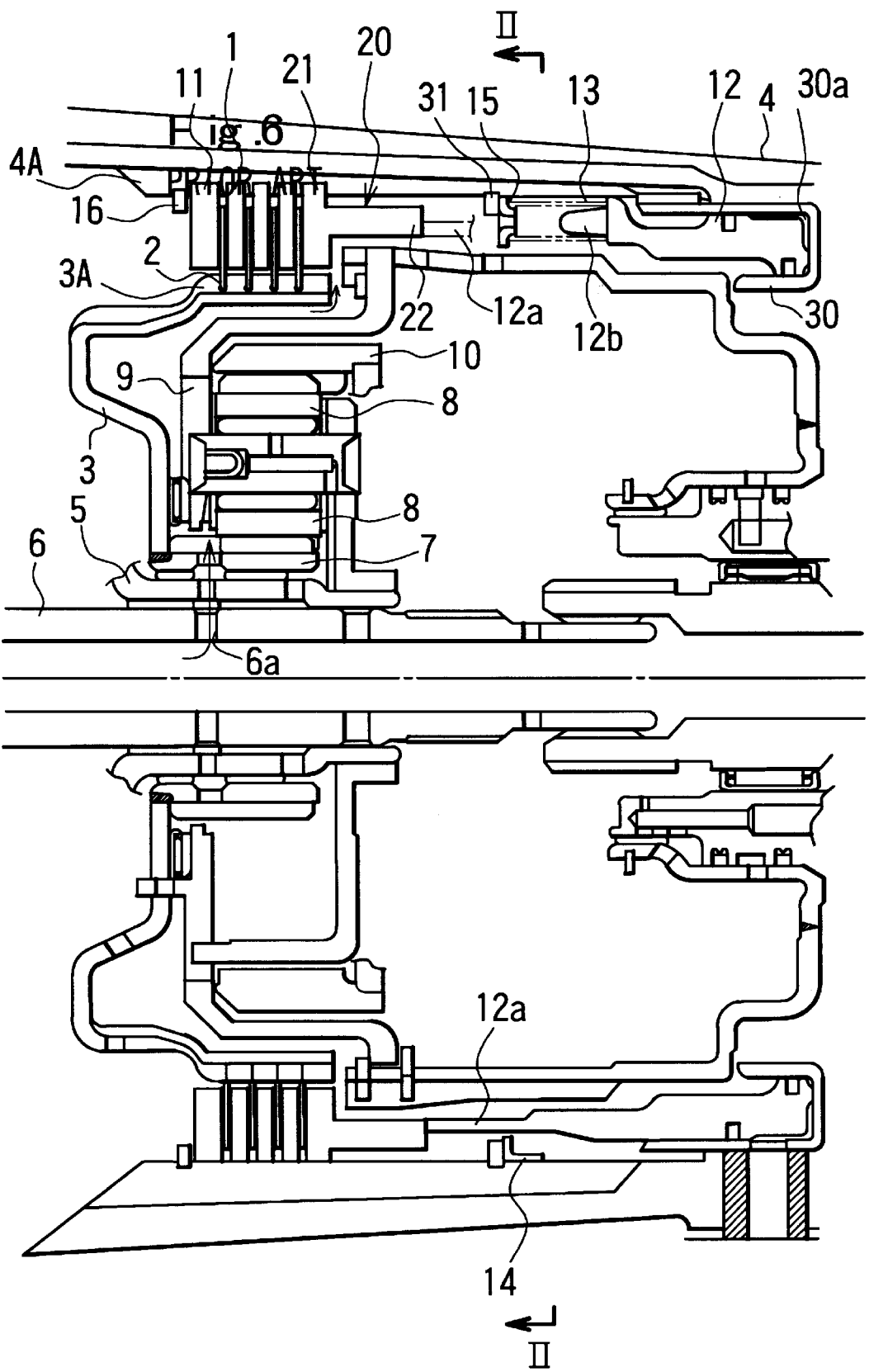
FIG. 1 is a cross sectional view showing an engaging device of an automatic transmission according to one embodiment of the present invention.
Figure 2:
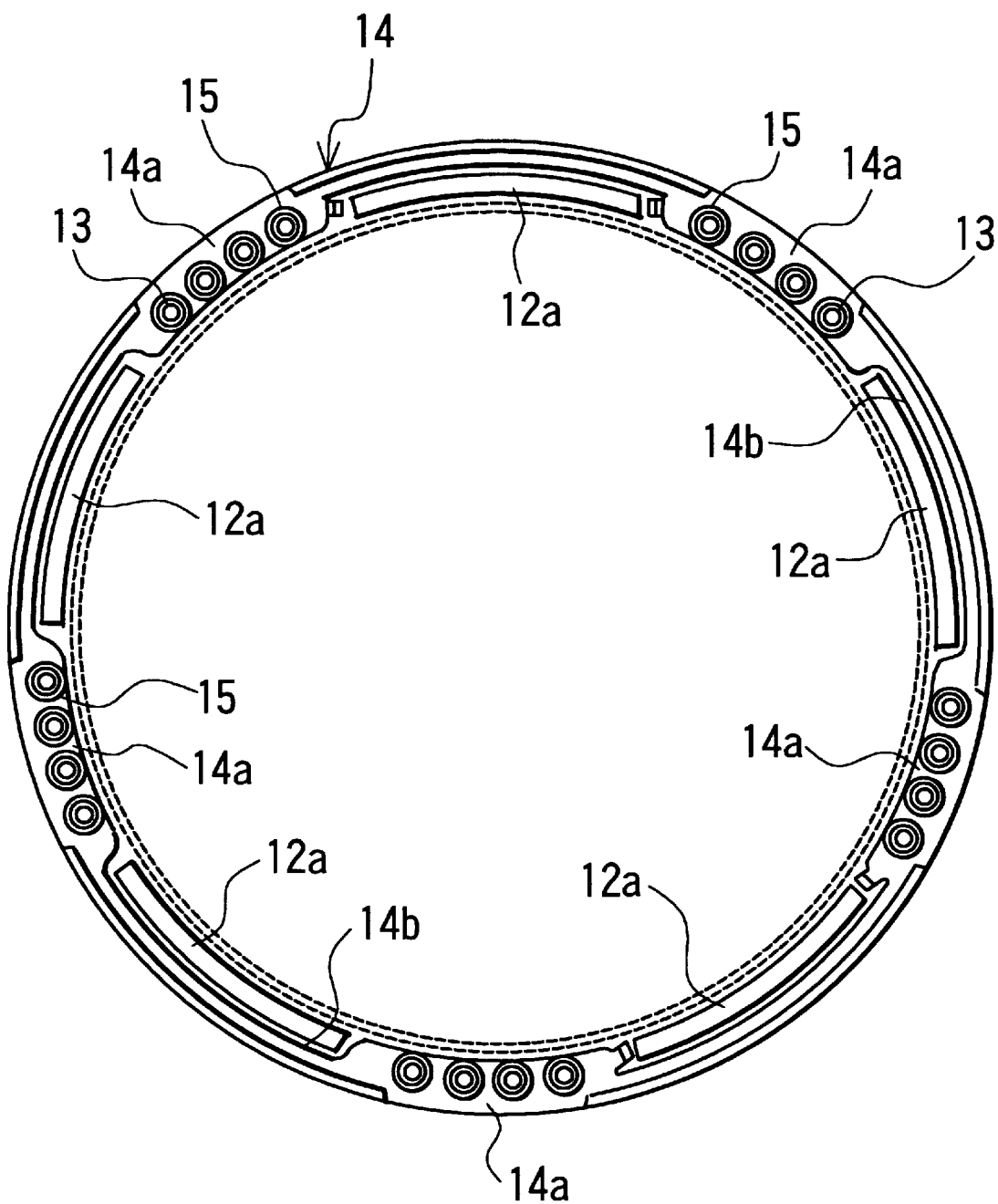
FIG. 2 is a cross sectional view taken along line II—II in FIG. 1.
Figure 3:
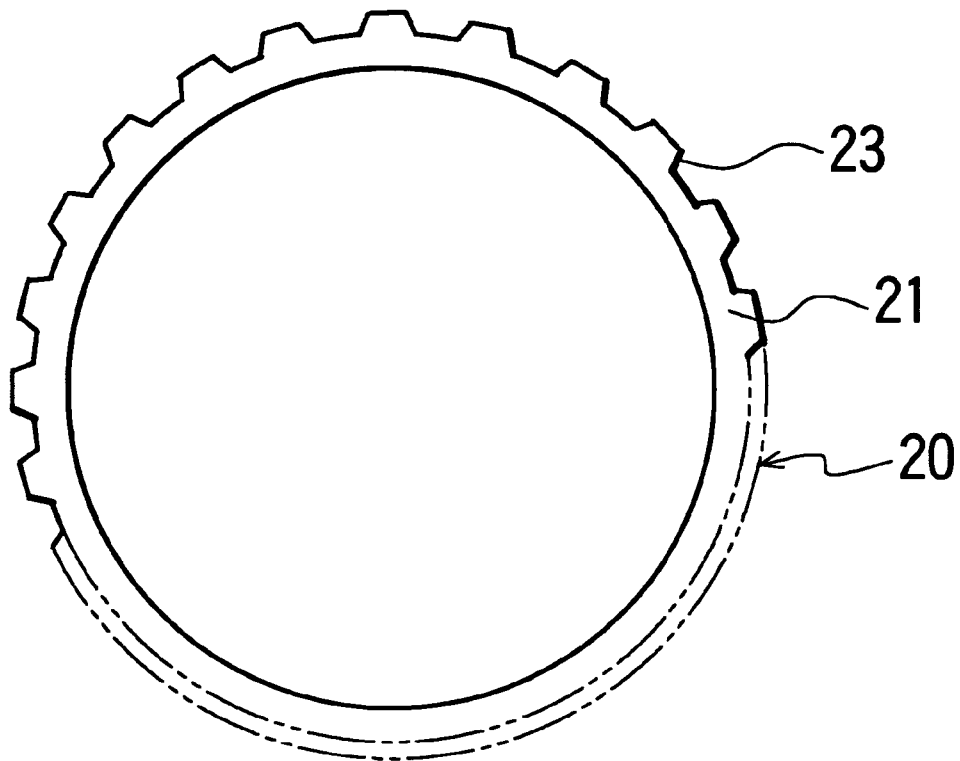
FIG. 3 is a left side view of a pressure receiving plate used in the engaging device of FIG. 1.
Figure 4:
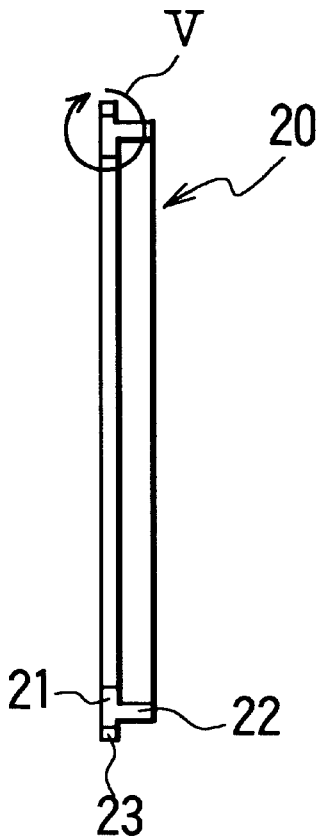
FIG. 4 is a vertical cross sectional view of the pressure receiving plate shown in FIG. 3.
Figure 5:
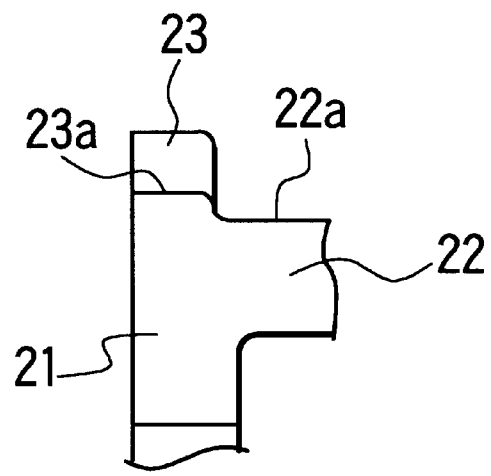
FIG. 5 is an enlarged view of part "V" in FIG. 4.
Figure 6:
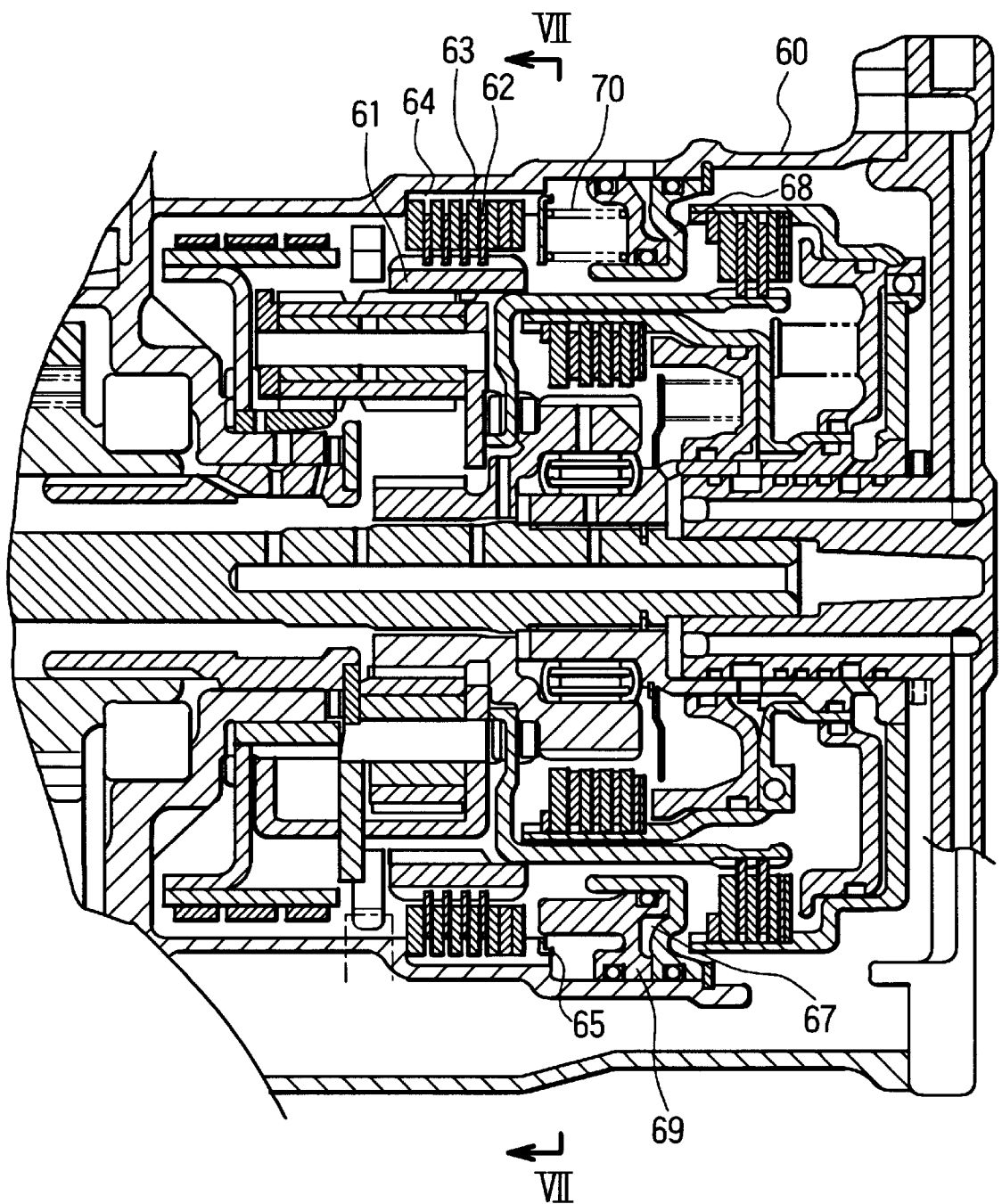
FIG. 6 is a vertical cross sectional view showing a known example of engaging device.
Figure 7:
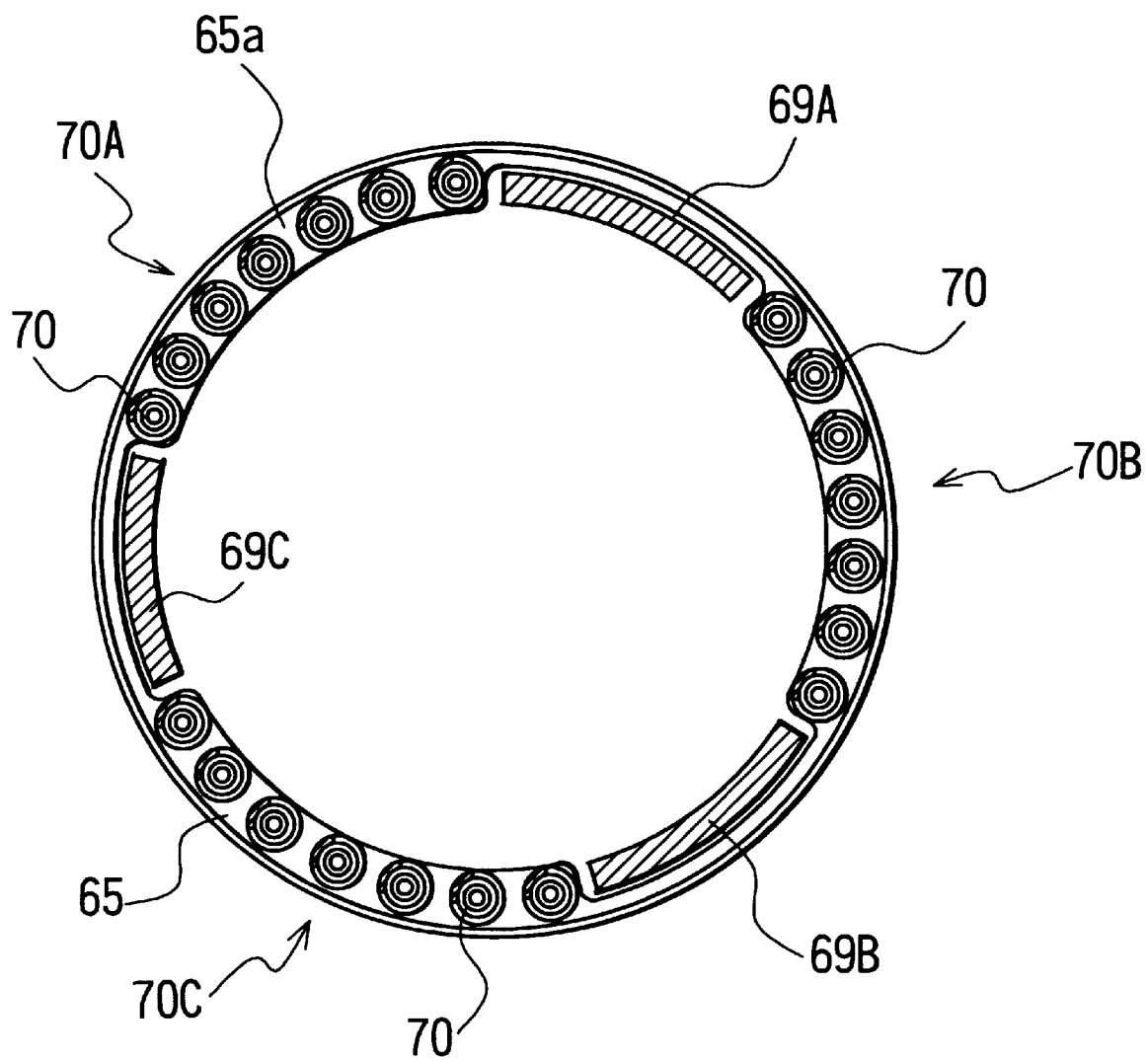
FIG. 7 is a cross sectional view taken along line VII—VII in FIG. 6.

FIG. 1 is a partial cross sectional view of an engaging device of an automatic transmission according to the preferred embodiment of the present invention, FIG. 2 is a cross sectional view taken along line II—II in FIG. 1, FIG. 3 is a left side view of a pressure receiving plate used in the engaging device of FIG. 1, FIG. 4 a vertical cross sectional view of the pressure receiving plate shown in FIG. 3, and FIG. 5 is an enlarged view of a part "V" of the pressure receiving plate of FIG. 4. FIG. 1 shows one planetary gear set, and one brake that is the engaging device of the present embodiment, among a plurality of planetary gear sets, a plurality of clutches and a plurality of brakes that constitute a change-gear mechanism of the automatic transmission.

The engaging device shown in FIG. 1 includes a plurality of driven plates 1 that are no-rotation side friction plates, and plurality of drive plates 2 that are rotation side friction plates. In operation, a suitable friction force is applied between the respective driven plates 1 and the corresponding drive plates 2, thereby to stop rotation of a rotary member 3 that engages with the drive plates 2. A spline 4A is formed in the inner surface of a casing (support member) 4 of the automatic transmission.

Meanwhile, a spline 3A that faces the spline 4A is formed on the outer periphery of the rotary member 3 that is rotatable relative to the casing 4. The spline 4A meshes with teeth formed on the outer peripheries of the driven plates 1, and the spline 3A meshes with teeth formed on the inner peripheries of the drive plates 2. The rotary member 3 is rotatably supported via a bearing by a rotary member 5 disposed radially inward. This rotary member 5 is rotatably supported via a bearing by a rotary member (not illustrated) that is coupled by spline with an input-side rotary shaft 6.

The planetary gear set shown in FIG. 1 includes a sun gear 7, a plurality of pinion gears 8, a planet carrier 9, and a ring gear 10. The sun gear 7 is rotatably supported on the outer periphery of the rotary member 5, and is fixed to the rotary member 3 such that these rotary members 3, 5 are rotated together. The plurality of pinion gears 8 are respectively supported by the planet carrier 9 such that the pinion gears 8 are freely rotatable relative to the carrier 9. Each of the pinion gears 8 engages with the sun gear 7 and ring gear 10. The planet carrier 9 and ring gear 10 are respectively linked with other elements, such as brakes and clutches.

The driven plates 1 and drive plates 2 alternately overlap with each other in an annular overlap region. The driven plates 1 are movable along the spline 4A in the axial direction of the automatic transmission, and the drive plates 2 are movable along the spline 3A in the same axial direction. The driven plates 1 and drive plates 2 are sandwiched by and between a retaining plate 11 and a hydraulic piston 12. The hydraulic piston 12 has five pressing parts 12a that are spaced from each other at substantially equal intervals in the circumferential direction.

In operation, this hydraulic piston 12 is moved to the left as viewed in FIG. 1 when a hydraulic pressure is applied to a hydraulic chamber 30a of a cylinder 30 disposed at the right-hand side, inner wall portion of the casing 4. A plurality of (twenty) return springs 13 are also provided for biasing the hydraulic piston 12 to the right as viewed in FIG. 1. The return springs 13 are divided into five groups each having four return springs 13, such that these groups of return springs 13 are located between the spring seat 14 and the left end face of the hydraulic piston 12 with substantially equal spacings in the circumferential direction, as shown in FIG. 2. In each group, four return springs 13 are substantially equally spaced from each other in the circumferential direction.

As shown in FIG. 2, the spring seat 14 has five spring receiving parts 14a formed at substantially equal intervals in the circumferential direction, and five cut-out parts 14b formed between the adjacent spring receiving parts 14a. Four spring receivers 15 disposed at substantially equal intervals in the circumferential direction are fixed in each spring receiving part 14a. With one end of each return spring 13 being positioned in a corresponding one of the spring receivers 15, the spring seat 14 abuts on an end face of a snap ring 31 fixed to the spline 4A, and the other end of each return spring 13 is fitted on a positioning boss 12b of the hydraulic piston 12 so as to abut on the left end face of the piston 12. Each pressing part 12a of the hydraulic piston 12 passes through a corresponding one of the cut-out parts 14b of the spring seat 14 so as not to interfere with the return springs 13, such that its front end extends toward the driven plates 1 and drive plates 2.

The retaining plate 11 is formed at its outer periphery with teeth that mesh with the spline 4A. A snap ring 16 fixed to the spline 4A serves to limit leftward movement of the retaining plate 11 in FIG. 1. When a hydraulic pressure is applied to the hydraulic chamber 30a, the hydraulic piston 12 is moved to the left while compressing the return springs 13. The hydraulic piston 12 cooperates with the retaining plate 11 that abuts on the snap ring 16 to compress overlapping portions of the driven plates 1 and drive plates 2. This compressive force gives rise to frictional force between the planes of the driven plates 1 and drive plates 2, and braking torque is transmitted along a path defined by the spline 4A, driven plates 1, drive plates 2 and spline 3A, so as to stop rotation of the rotary member 3.

In the engaging device of the automatic transmission of the present embodiment, the pressure receiving plate 20 is disposed between the hydraulic piston 12 and the outermost friction plate (drive plate 2 in the present embodiment) closest to the hydraulic piston 12, out of the driven plates 1 and drive plates 2, as shown in FIG. 1.

As shown in FIG. 1, FIG. 3, and FIG. 4, this pressure receiving plate 20 has an annular friction plate portion 21 that meshes with the spline 4A, and a cylindrical pressure receiving portion 22 formed integrally with the friction plate portion 21. The cylindrical pressure receiving portion 22 protrudes from the friction plate portion 21 toward the hydraulic piston 12, and has an end face that may abut on five pressing parts 12a of the piston 12.

The annular friction plate portion 21 is formed at its outer periphery with teeth 23 that mesh with the spline 4A, as shown in FIG. 3. The cylindrical pressure receiving portion 22, on the other hand, is formed such that its outer circumferential surface 22a is positioned radially inwardly of bottom parts 23a of the teeth 23 of the friction plate portion 21, as shown in FIG. 4 and FIG. 5. In addition, the thickness of the friction plate portion 21 is made substantially as thin as that of each drive plate 1, so that the pressure receiving plate 20 is able to slide smoothly along the spline 4A in the same manner as the driven plates 1.

In the engaging device constructed as described above, the pressure receiving plate 20 has the annular friction plate portion 21 meshed with the spline 4A of the casing 4, and the cylindrical pressure receiving portion 22 protruding from this friction plate portion 21 toward the hydraulic piston 12 with its end face capable of abutting on five pressing parts 12a of the piston 12, and the thus formed pressure receiving plate 20 is disposed between the hydraulic piston 12 and the outermost drive plate 2 closest to the piston 12. When the cylindrical pressure receiving portion 22 of the pressure receiving plate 20 is pressed by the five pressing parts 12a of the hydraulic piston 12, therefore, the friction plate portion 21 formed integrally with the cylindrical pressure receiving portion 22 having high rigidity is not deformed, and uniformly transmits pressing forces received from the pressing parts 12a to the driven plates 1 and drive plates 2. As a result, the driven plates 1 and drive plates 2 contact with each other uniformly over the entire surfaces thereof.

Accordingly, the durability of the driven plates 1 and drive plates 2 can be advantageously improved in the illustrated embodiment.

In the structure shown in FIG. 1, a lubricating oil passes through an oil path inside the input-side rotary shaft 6 and a through-hole 6a of the rotary shaft 6, and flows into the space between the rotary member 3 and the planet carrier 9 as indicated by the arrow in FIG. 1, to be supplied into the space in which the driven plates 1 and drive plates 2 are located. The lubricating oil thus supplied to the space having the driven and drive plates 1, 2 is blocked by the cylindrical pressure receiving portion 22 provided as described above, and is therefore less likely to escape to the outside of these plates 1 and 2. Thus, the quantity of lubricating oil accumulating in the space having the driven and drive plates 1 and 2 increases, and the durability of these plates 1 and 2 is further improved.

Furthermore, since the thickness of the friction plate portion 21 formed with teeth 23 is made substantially as thin as that of each driven plate 1, the pressure receiving plate 20 can slide smoothly along the spline 4A.

While the engaging device according to the present invention is applied to a brake of an automatic transmission in the illustrated embodiment, the present engaging device may be applied to a clutch of an automatic transmission.

While the annular friction plate portion 21 of the pressure receiving friction plate 20 is made in surface contact with one of the drive plates 2 in the illustrated embodiment, the annular plate portion of the pressure receiving plate 20 may be made in surface contact with one of the driven plates 1. In this case, the annular plate portion only presses the driven plate 1, and no frictional force needs to be generated between this plate portion and the driven plate 1. Accordingly, the plate portion need not be formed by a frictional plate, but may be formed from a mere annular plate.

As explained above, according to the present invention, the pressure receiving plate disposed between the first and second friction plates and the hydraulic piston is constructed to have the annular plate portion meshed with the spline of the support member holding the hydraulic piston, and the cylindrical pressure receiving portion formed integrally with the annular plate portion to protrude from this plate portion toward the hydraulic piston with its end face capable of abutting on the plurality of pressing parts of the piston. When the cylindrical pressure receiving portion of the pressure receiving plate is pressed by the plural pressing parts of the hydraulic piston, therefore, the annular plate portion formed integrally with the cylindrical pressure receiving portion having high rigidity is not deformed, and uniformly transmits pressing forces received from the pressing parts to the first and second friction plates. As a result, the first and second friction plates contact with each other uniformly over the entire surfaces thereof. Accordingly, the durability of the friction plates can be improved.

With the cylindrical pressure receiving portion provided as described above, a lubricating oil supplied to the first friction plates and second friction plates is blocked by the pressure receiving portion, and is therefore less likely to escape to the outside of these friction plates. Thus, the quantity of lubricating oil accumulating in the space having the first and second friction plates increases, and the durability of these friction plates is further improved.

What is claimed is:

1. An engaging device comprising:

first and second support members having first and second splines, respectively, that face with each other in a radial direction, said support members being rotatable relative to each other;

a plurality of first friction plates that mesh with said first spline of said first support member;

a plurality of second friction plates that mesh with said second spline of said second support member, said first and second friction plates alternately overlapping with each other in an annular overlap portion of an engaging area thereof;

a hydraulic piston that is held by said first support member to be movable in a direction of an axis of relative rotation of said first and second support members, said hydraulic piston having a plurality of pressing parts that are spaced from each other in a circumferential direction, for pressing said plurality of said first and second friction plates in an axial direction thereby to give an engaging force to the friction plates; and a pressure receiving plate disposed between said plurality of said first and second friction plates and said hydraulic piston, comprising an annular plate portion that meshes with said first spline of said first support member holding said hydraulic piston, and a cylindrical pressure receiving portion formed integrally with said annular plate portion to protrude from the annular plate portion toward said hydraulic piston, said cylindrical pressure receiving portion having an end face that is able to abut on said plurality of pressing parts of the hydraulic piston.

2. An engaging device according to claim 1, wherein said first support member comprises a case of an automatic transmission, and said second support member comprises a member that is rotatable relative to said case.

3. An engaging device according to claim 2, wherein said annular plate portion of the pressure receiving plate is formed by a frictional plate.

* * * * *